(12) United States Patent
Smith et al.

(10) Patent No.: US 10,697,845 B2
(45) Date of Patent: Jun. 30, 2020

(54) APPARATUS FOR HYDROSTATIC TESTING

(71) Applicants: Randall M. Smith, Metairie, LA (US);
Beau J. Giglio, Metairie, LA (US)

(72) Inventors: Randall M. Smith, Metairie, LA (US);
Beau J. Giglio, Metairie, LA (US)

(73) Assignee: Pressure Technologies, LLC, Metairie, LA (US)

( * ) Notice: Subject to any disclaimer, the term of this patent is extended or adjusted under 35 U.S.C. 154(b) by 0 days.

(21) Appl. No.: 15/870,975

(22) Filed: Jan. 14, 2018

(65) Prior Publication Data
US 2019/0250061 A1    Aug. 15, 2019

(51) Int. Cl.
*G01M 3/02* (2006.01)
*G01M 3/28* (2006.01)
*F16L 55/11* (2006.01)
*F16L 23/00* (2006.01)

(52) U.S. Cl.
CPC .......... *G01M 3/022* (2013.01); *F16L 23/006* (2013.01); *F16L 55/1108* (2013.01); *G01M 3/2815* (2013.01)

(58) Field of Classification Search
CPC ... G01M 3/022; G01M 3/2815; F16L 23/006; F16L 55/1108
USPC ............... 138/90; 285/207; 73/49.5, 49.6
See application file for complete search history.

(56) References Cited

U.S. PATENT DOCUMENTS

| | | | | |
|---|---|---|---|---|
| 405,054 | A | * | 6/1889 | Sexton ............................ 138/90 |
| 3,388,588 | A | * | 6/1968 | Vincenot ............. G01M 3/2846 73/49.6 |
| 10,428,981 | B2 | * | 10/2019 | Smith ................. F16L 19/0237 |

* cited by examiner

*Primary Examiner* — Greg Binda
(74) *Attorney, Agent, or Firm* — Henry E Naylor

(57) ABSTRACT

An apparatus for hydrostatic testing of openings in items surrounded by a flange, such as flanged pipe sections, flanged pipelines, flanged hose assemblies, as well as other flanged equipment requiring initial and/or periodic pressure testing.

16 Claims, 17 Drawing Sheets

ABSTRACT

APPARATUS FOR HYDROSTATIC TESTING

FIELD OF THE INVENTION

This invention relates to an apparatus for hydrostatic testing of openings in items surrounded by a flange, such as flanged pipe sections, flanged pipelines, flanged hose assemblies, flanged nozzles, as well as other flanged equipment requiring initial Code compliance and/or periodic pressure testing.

BACKGROUND OF THE INVENTION

In most industrialized areas of the world, vast quantities of fluids are transported, stored, handled, and processed through flanged conduits and equipment such as flanged pipelines, flanged piping, and flanged hose assemblies. For example, process and power piping and pipelines are commonly comprised of a plurality of flanged pipe sections secured together at their flanged ends with use of a suitable securing means, such as by use of a plurality of bolts or nuts and bolts. Non-limiting examples of fluids that are transported through flanged conduits and equipment include crude oils, lubricating oils, natural gas, transportation fuels, as well as a variety of petrochemical feedstock and product streams, slurries, industrial gases, food products, pharmaceuticals, etc. Further, such flanged conduits are often of considerable length and can extend for many miles over all types of geographic terrain.

A substantial fraction of pipelines today is located underneath bodies of water and are often subjected to saltwater environments. Piping and pipeline integrity and safety are of utmost concern. Many of these pipelines, process equipment, and related piping in use today are continuously filled with valuable and potentially hazardous fluids. Some such fluids can be lethal, explosive, highly flammable, or highly reactive under inordinately high pressures and temperature combinations. Consequently, sections of traditional piping, including piping manufactured for use for these pipelines, as well as related flanged equipment, such as pressure vessels and heat exchangers, etc., are generally required to undergo both initial testing at the time of fabrication, alteration, or repairs and subject to Code, statutory mandated, and/or periodic hydrostatic testing. This testing is performed under the constraints dictated by the specific industry, piping system Code, to which it is designed, the customer, as well as constraints that are required by various governing bodies, including in some instances sound engineering judgment. One such specification that is required is that the pressure integrity of the flanged piping and/or pipeline and related flanged equipment is validated before being placed into service and throughout its intended use and commercial lifetime.

Hydrostatic testing generally requires that each end of a flanged item to be tested be sealed against an applied testing pressure without leaking during the duration of the test. The flanged item to be tested is typically filled with a fluid under pressure, generally water, or in some instances an inert gas, such as nitrogen. Conventionally, a blind flange of the testing apparatus is bolted onto the flange at each end of the flanged item to be tested. The connecting flanges are then typically bolted together using code required torque sequences to ensure that at least one sealing gasket between flanges is fully energized and capable of resisting the hydrostatic pressure during testing and any applied external loads. Depending on the size of the flange and the selected test pressure, from about four to dozens of bolts per set of flanges can be required. Securing and torqueing these bolts is an extremely laborious, repetitive, and time-consuming process that can take up to several hours to one or more days to simply prepare a single flanged connection for hydrostatic testing. Therefore, there is a need in the art for an apparatus that will substantially reduce the time and costs of performing hydrostatic testing.

SUMMARY OF THE INVENTION

The present invention relates to an apparatus for sealing a flanged opening of a flanged item to be hydrotested. The apparatus is comprised of a rear plate section which has a slot defining a C-shape for receiving a flange of a flanged opening to be sealed. There is also provided a front circular plate section having a through-hole at its center for receiving a shaft capable of longitudinal movement and a middle section also having a slot defining a C-shape for receiving a flange of a flanged opening to be sealed. The middle section has a first side and a second side and is secured side-by-side at its first side to the rear plate section and secured side-by-side at its second side to the front section. All three of said rear plate section, said middle section and said front section have the same radius of curvature. All three sections are joined to form an annular cavity.

The apparatus of the present invention also has an elongated shaft having a front end and a rear end, wherein the rear extends through the through-hole of the front circular plate and into the annular cavity. There is also provided a blind flange that has a first face and a second face. The second face is secured at its center to the rear end of the elongated shaft. The first face contains a sealing material in the form of a ring embedded into its face but extending away from said face an effective distance to be capable of being compressed to form a fluid-tight seal when pressed against a flange of a flanged opening to be sealed. The diameter of the ring of sealing material is greater than the diameter of the opening of said flanged opening.

The size of the annular cavity is defined by the width of the middle section which width is sufficient to allow enough room for the flange of a flanged opening to be sealed and for said blind flange to be moved into and out of sealing contact with said flange of a flanged opening to be sealed.

An actuator is provided and is secured to the front surface of the circular front plate. The actuator, when actuated, is capable of horizontally moving the shaft and blind flange in an out of contact with a flange of the flanged opening to be sealed.

A removable adapter plate is also proved and has substantially the same radius of curvature as the annular cavity and also has a slot substantially identical to that of the rear plate section and is capable of accepting a targeted flanged item to be tested. The removable adapter plate can be mechanically held in position using any suitable holding means between the front face of said rear plate section and the flange of a flanged item to be tested.

DETAILED DESCRIPTION OF THE PRESENT INVENTION

Figure 1:
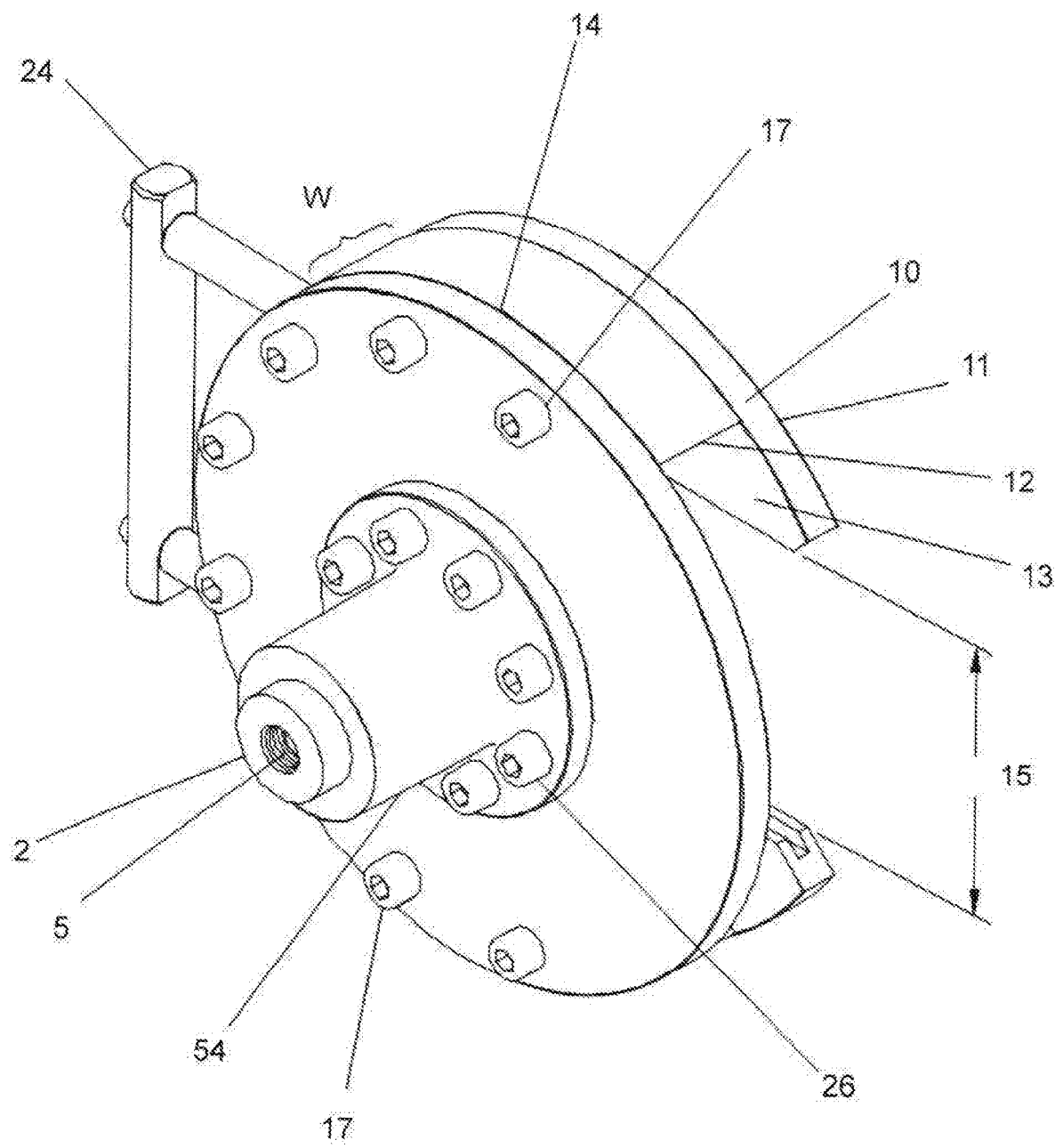
FIG. 1 hereof is an isometric view of the front of a preferred embodiment of the apparatus of the present invention showing a generic actuator means (54) for advancing and retracting a blind flange, (also sometimes referred to as a blind plate), in and out of sealing contact against the face of the flange of a flanged item to be tested.

A substantial number of flanged conduits and equipment carry potentially hazardous fluids, often at elevated temperatures and pressures. Because safety is of upmost importance such flanged conduits and equipment must to tested before, as well as during, industrial use. The primary testing method used for such flanged items is pressure testing, also referred to as hydrostatic testing, or hydrotesting. Both terms can be used interchangeably herein. It will be understood that the terms "flanged item", "flanged opening", and flanged equipment can also be used interchangeably herein. Non-limiting examples of such flanged items that are typically required to be pressure tested include piping, pipelines, hoses, pumps, compressors, mixers, boilers, tanks, pressure vessels, heat exchangers, and the like. Such flanged items typically come under numerous regulatory and governmental safety compliance requirements as well as design and fabrication Code criteria. As such, hydrotesting of flanged piping systems, pipelines. as well as related flanged components and equipment are required to be hydrostatically tested under statutory mandates and codes such as applicable ASME Boiler & Pressure Vessel Codes, related Piping Codes, including local and state ordinances, as well as industrial standard requirements and criteria. Hydrostatic testing is found in industries and uses such as, but not limited to, high-pressure superheated power steam generation, utility steam generation, offshore oil and gas, petroleum exploration, chemical process, petro-chemical process, petroleum refinery, pharmaceutical, pipelines, building construction, military, petroleum liquid and gas storage tank farm facilities, ship loading and unloading docks, railcar loading and unloading facilities, etc.

Hydrostatic testing typically comprises closing both ends of a flanged item to be tested with a device designed and intended to resist the applied hydrostatic test pressure at the specified pressure and test temperature, and which is compatible with the test fluid. Blind flanges are conventionally used to close both ends. For example, one end is closed using a blind flange having a means for allowing the release of a fluid, such as air, which is displaced when a test fluid, such as water. The other end, which will also be closed using a second blind flange, but having attached thereto equipment to introduce test fluid into the flanged item to be tested and equipment to measure pressure fluctuations, if any, during testing.

At least one gasket is affixed, or inserted, between each of the blind flanges and the flanges of the item to be tested. Gaskets suitable for such use can be made from any suitable sealing material. Non-limiting examples of such suitable sealing materials include metallic materials, elastomeric materials, non-asbestos fiber based materials, and graphite materials. Further, the gaskets can be of a variety of configurations depending on the flanged item to be tested. Non-limiting examples of such configurations include full faced, inner bolt circle, segmented, and spiral wound, all of which are well known in the art. Preferred spiral wound gaskets are typically made by winding a metal strip, usually a stainless steel, and a softer filler material such as graphite or PTFE. It is preferred to use multiple O-rings, preferably comprised of an elastomeric material. The O-ring, of any other gasket in the form of a ring, will have a diameter greater than the diameter of the opening of the flanged item to be tested. It is also preferred that the O-rings be embedded within matching grooves annularly positioned on the sealing face of the blind flange.

The apparatus of the present invention is secured to the testing end of the item to be tested and will include a means by which a test fluid, preferably water, can be introduced into the flanged item. The introduction of water will displace air within the item which can be released into the atmosphere at either end of the item to be tested. For example, it is preferred that the non-test end of the flanged item also have an apparatus of the present invention secured thereto so that displaced air can be released through an outlet means, such as a valve, attached to the apparatus. At that point, water or other test fluid, will be turned off and pressurized to bring the pressure up to the required test pressure and hold it there for the required duration of the test. The desired test pressure according to code, or a prescribed test pressure, which will typically be about 130-150% of the designed working pressure of the flanged item being tested. Pressurization can be applied by any suitable means, but it is generally accomplished by use of a piston pump well known to the art and designed specifically for hydrostatic testing. The piston pump can be powered by any suitable means, such manually or by pneumatic, electrical, or hydraulic means. It will be noted that hydrotesting can also be accomplished using a broad array of industrial gases, preferably an inert gas, more preferably nitrogen. Water is the most preferred testing fluid. The flanged item being tested must not exhibit any observed leakage or pressure declination, except for incidental changes due to atmospheric temperature change or solar radiation exposure. After completion of the prescribed applied pressure and holding time, pressure is released and the equipment drained.

Preparation for conventional hydrostatic testing is extremely laborious and costly, both in human resources and time needed to accomplish just the pre-testing procedure. For example, depending on the nominal size of a pipe, the system rated design pressure, and the test temperature, flanged connections can vary significantly in size, weight, and the number of stud bolts or traditional bolts, or bolt and nuts, required to complete the connection. The number of bolts and nuts can vary between about 4 bolts and 8 nuts to about 60 bolts and 120 nuts, or more. Blind flanges can weigh between about 2 pounds to over 16,000 pounds depending on the nominal size and pressure rating. As such, for the blind flange to both energize the gasket and adequately resist hydrostatic end force, the flange bolting must be tightened in a methodical multi-step method. For example, ASME Code (ASME PCC-1-2013) requires that the bolting be torqued (tightened) using a six step, complex cross-pattern tightening sequence methodology as follows:

| Torque increments for cross-pattern tightening | |
|---|---|
| Install | Hand-tighten then "snug-up" to 20 lb-ft (not to exceed 20% of target torque value). Check flange gap around circumference for uniformity. If the gap around the circumference is not reasonably uniform, make the appropriate adjustments by selective tightening before proceeding. |
| Round 1 | Tighten to 20% to 30% of the target torque value. Check flange gap around circumference for uniformity. If the gap around the circumference is not reasonably uniform, make the appropriate adjustments by selective tightening/loosening before proceeding. |
| Round 2 | Tighten to 50% to 70% of the target torque value. Check flange gap around circumference for uniformity. If the gap around the circumference is not reasonably uniform, make the appropriate adjustments by selective tightening/loosening before proceeding. |
| Round 3 | Tighten to 100% of the target torque value. Check flange gap around circumference for uniformity. If the gap around the circumference is not reasonably uniform, make the appropriate adjustments by selective tightening/loosening before proceeding. |
| Round 4 | Continue tightening the bolts, but on a circular, clockwise pattern until no further nut rotation occurs at the round 3 torque target value. |
| Round 5 | Time permitting, wait a minimum of four (4) hours and repeat Round 4; this will restore the short-term creep relaxation/nut embedment losses. |

Given the complexity of bolt installation and tightening requirements, as well as rigging, handling, and lifting very heavy components, the conventional procedure is expensive, extremely laborious, time-consuming, and dangerous. As previously mentioned, conventional hydrostatic testing procedures can take from a couple of hours to one or more days before the hydrostatic test can be initiated by filling the item to be tested with the test fluid and the results observed and measured.

The apparatus of the present invention eliminates the need for installing and torqueing a plurality of bolts. Additionally, bolting stretches when tightened to energize a gasket to resist hydrostatic test pressure. Therefore, bolting used for conventional hydrostatic testing has a relatively short lifecycle. Furthermore, bolting used for hydrostatic testing must also meet various Code metallurgical and procurement standards, making it relatively expensive to stock and maintain. There are myriad sizes and lengths required to be inventoried for carrying out testing. Further, the significant reduction in time needed to perform hydrostatic testing with use of the instant apparatus proportionally reduces safety risk exposure, costs, and enables considerable enhancement of productivity. This allows substantially more pipes, hoses, and/or equipment to be tested in any given amount of time. The apparatus of the present invention is a quick-acting device that can be installed in minutes as opposed to hours or days, and can be sealingly energized in seconds against the flange of the flanged item to be tested.

The instant apparatus can be fabricated from any suitable material that can withstand the hydrostatic testing pressures and temperatures, with an appropriate margin of safety. Non-limiting examples of such suitable materials include conventional carbon steel, alloy steel, corrosion resistant steel alloys, aluminum alloys, copper-nickel alloys, and titanium. Also suitable are engineered light-weight aerospace aluminum alloys and forgings, in addition to machined plate, and/or round or flat bar stock typically possessing mechanical properties that significantly exceed that of most common carbon steel alloys.

Preferred materials are the 7xxx series alloys containing the addition of zinc in the range of about 0.8 to about 12 wt %. In particular, 7075 and 7178 containing chromium, copper iron, magnesium, and manganese additions, including zirconium and titanium for forged components and has a tensile strength of up to and including 88 ksi with a corresponding yield strength of 78 ksi. Other preferred aluminum alloys include, but are not limited to the 6xxx series alloys having a tensile strength up to and including 58 ksi and a corresponding yield strength of 52 ksi, containing magnesium and silicon additions of about 1.0 weight % and are more easily extrudable than other aluminum alloys. Other preferred aluminum materials are the 5xxx series alloys having a tensile strength up to and including 54 ksi and a corresponding yield strength of 41 ksi, containing the addition of magnesium in the range of about 0.8 to 5.1 weight %. The 2xxx series alloys include from at least about 0.5 wt. % Copper (Cu) to about 8 wt. % Cu and having an ultimate tensile strength of up to 72 ksi with a corresponding yield strength of 67 ksi. All the above weight percents are based on the total weight of the alloy.

Another class of suitable materials are the chromium-molybdenum heat-treated alloys steels such as 4130, 4140, 4142, 4340, etc. with tensile strengths averaging 100-150 ksi and corresponding yield strengths averaging of 90 ksi. Also suitable are metallic materials that include copper-nickel alloys, and in particular 70-30. Other preferred materials include high-performance nickel alloys such as alloy 600, 625, and 800 with tensile strengths of 85-145 ksi and corresponding yield strengths of 80-110 ksi.

It is also within the scope of this invention that lightweight, high-strength, fiber-reinforced composite materials that are typically comprised of a polymer or ceramic matrix that can be a polymeric material, or a ceramic can be used. The fibers of such materials are generally carbon, metallic, ceramic, carbon nanofibers, or a combination thereof, that can be oriented in a desired orientation in the matrix to add strength and to prevent de-lamination. Essentially, the present invention can be fabricated from any suitable metallic or non-metallic material capable of meeting the required strength needed to resist the hydrostatic test pressure with a suitable safety margin. It is preferred that the apparatus of the present invention be light enough to be manually lifted (far less weight than a conventional carbon or stainless steel blind flange) for the more commonly tested nominal pipe sizes. Obviously, larger diameter and higher pressure rated flange system can require more than one person to deploy, or can require the use of a hoisting device and lifting eyes. Irrespectively, use of the apparatus of the present invention significantly reduces test time, resources, and cost, while enhancing safety exposure to personnel when compared to conventional methods.

The present invention is designed and intended to be deployed over an extremely broad range of flange designs, configurations, and materials, including but not limited to flat face, raised face, and/or ring joint, screwed, slip-on, socket weld, weld neck and long weld neck. The present invention can also be used with intermediate barrel, heavy barrel, equal barrel, lap joint, and orifice flanges for every pressure Class as dimensionally specified in ASME B16.1, B16.5, B16.24, B16.36, B16.42, or B16.47, and other industry standards such as applicable Manufacturers Standardization Society (MSS) and ASTM specifications. The present invention is intended to also be deployed on a broad array of military, proprietary, and hydraulic power flanges. Essentially, the present invention can be used on any flanged fluidic or pneumatic connection germane to any industry, and which can be fabricated from any suitable metallic or non-metallic material.

Figure 11:
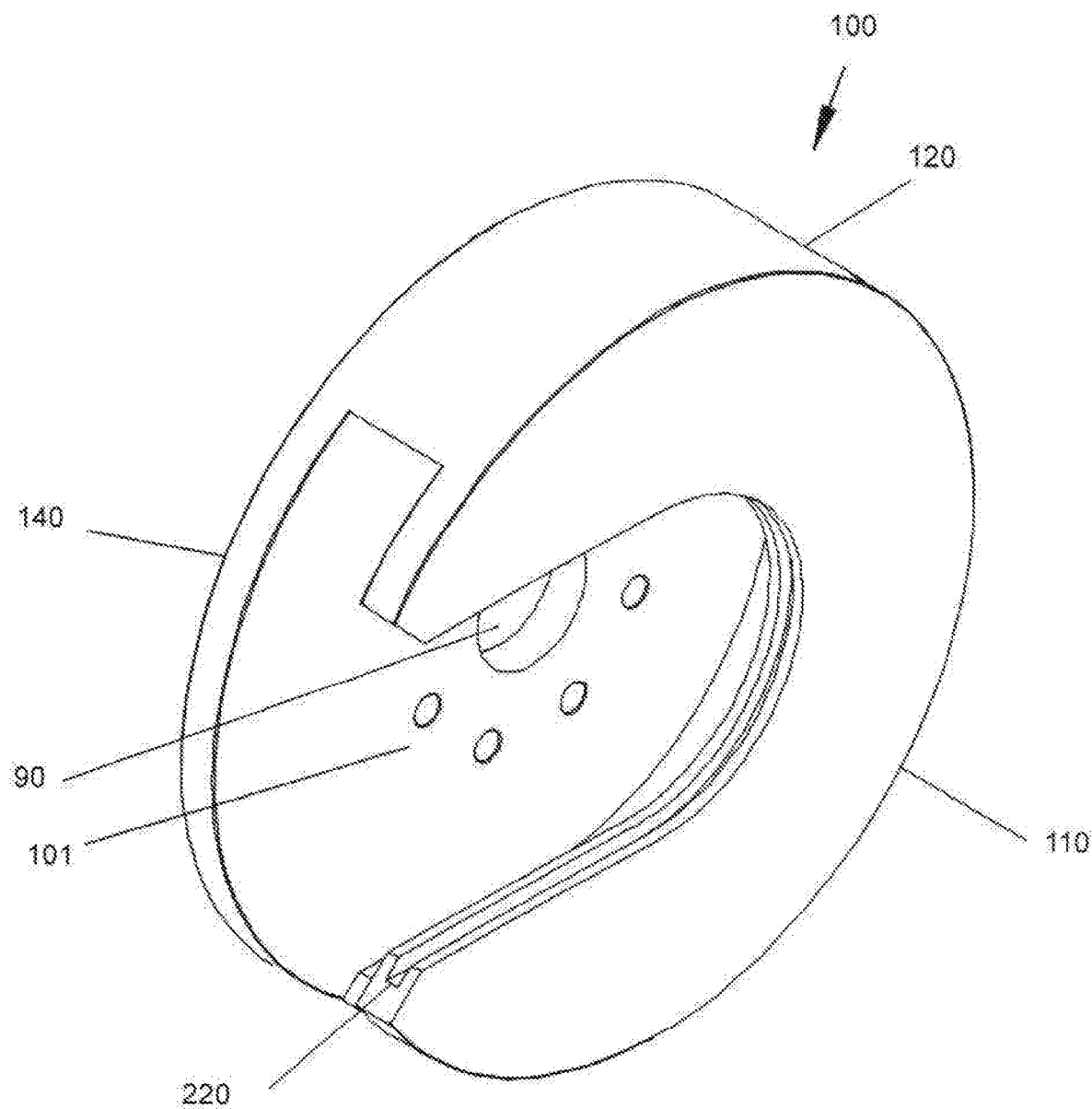
FIG. 11 hereof is an isometric rear view of the preferred embodiment of the apparatus of FIG. 10 hereof, wherein the front section, the spacer section, and the rear sections are not individual component parts secured together, but are sections, or areas, of a single unitary piece. The rear section shows groove 220 for receiving the tongue, or projection 210, of adapter plate of FIGS. 2A and 2B hereof.
Figure 14:
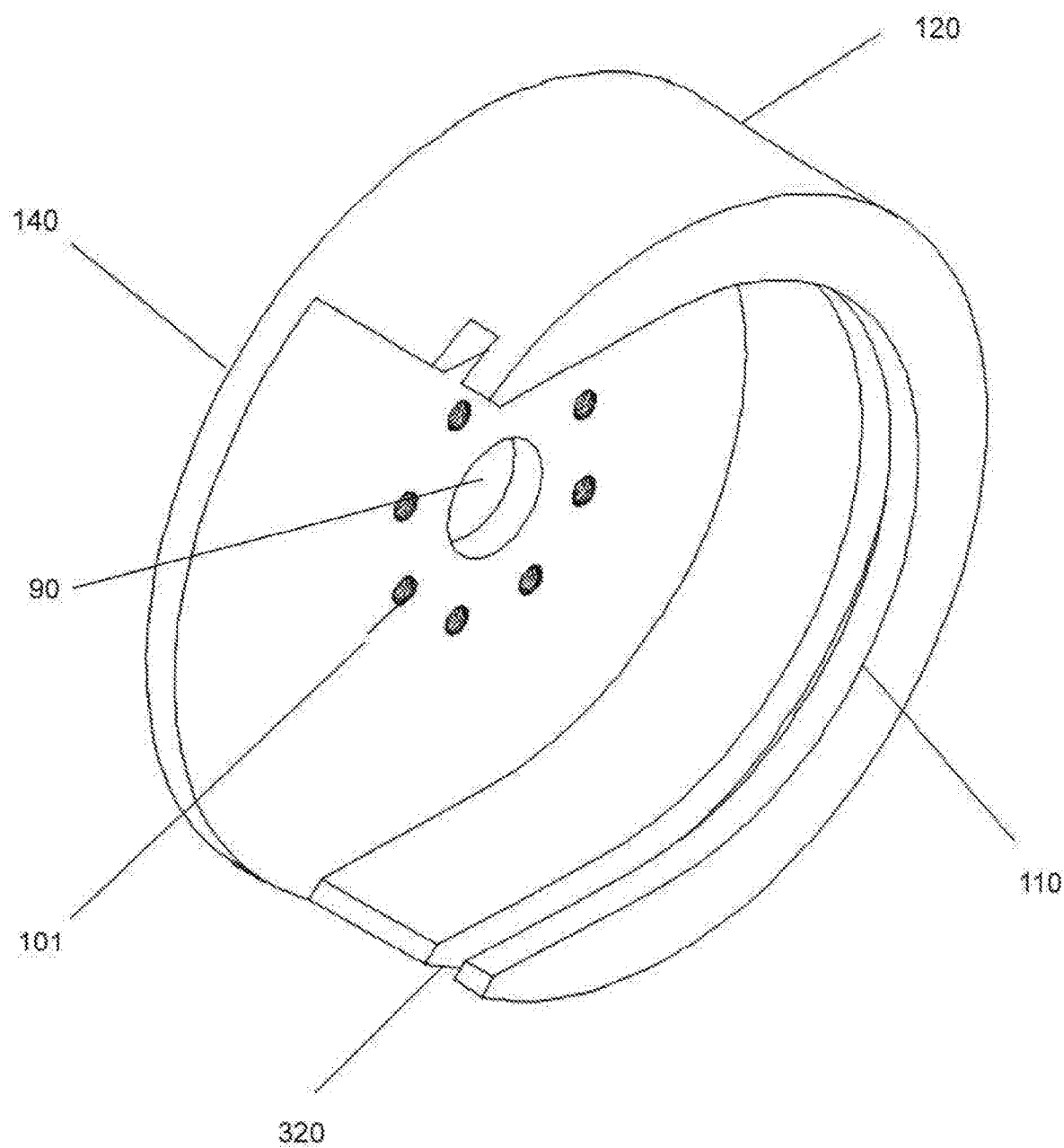
FIG. 14 hereof is single unit apparatus of the present invention similar to that illustrated in FIGS. 10 and 11 hereof, but showing groove 320 for receiving the flange section 330 of the adapter plate 300 illustrated in FIGS. 13A to 13C.

Not only is the present invention capable of being deployed over a broad range of flange designs and sizes, but also, the same basic piece of apparatus of the present invention, which is sometimes referred to herein as the "annular cavity", can be used to test a variety of nominal flange sizes and ASME pressure Classes. This is accomplished by use of adapter plates of the present invention in conjunction with an integral flange cavity in the body of the apparatus—the annular cavity. The body of the apparatus depicted in FIG. 11 contains an integral U-shaped annular cavity bounded by the front surface of back plate 110, the rear surface of front plate 140, and ring interior surface of 120, also depicted in FIG. 14 hereof. While FIGS. 11 and 14 show the three sections of 110, 120, and 140 as integral parts of a single unit, it is understood that each of these parts can be separately manufactured parts secured together by any suitable means, such as by the use of bolts. Depending on the diameter and ASME pressure Class of the flange of the flanged item to be tested, a suitable adapter plate having a corresponding slot size opening, can be inserted between the blind flange and the rear plate section 110 of the apparatus. An adapter plate of the present invention will typically be used when the diameter of the flange of a flanged item to be tested is too small for the slot of the rear section of the apparatus. The adapter plate for purposes of FIG. 14 hereof has a thickness that will match the width of groove 320 for securing the adapter plate in the annular cavity. An adapter plate is used when the flange of the item to be tested is small enough that it would push through and not be secured in the testing apparatus. For such cases, an adapter plate is used having a slot size that is small enough to be used with the smaller diameter flanged item, but whose overall size is large enough that it will not push through the slot of the rear plate section of the testing apparatus.

Figure 2:
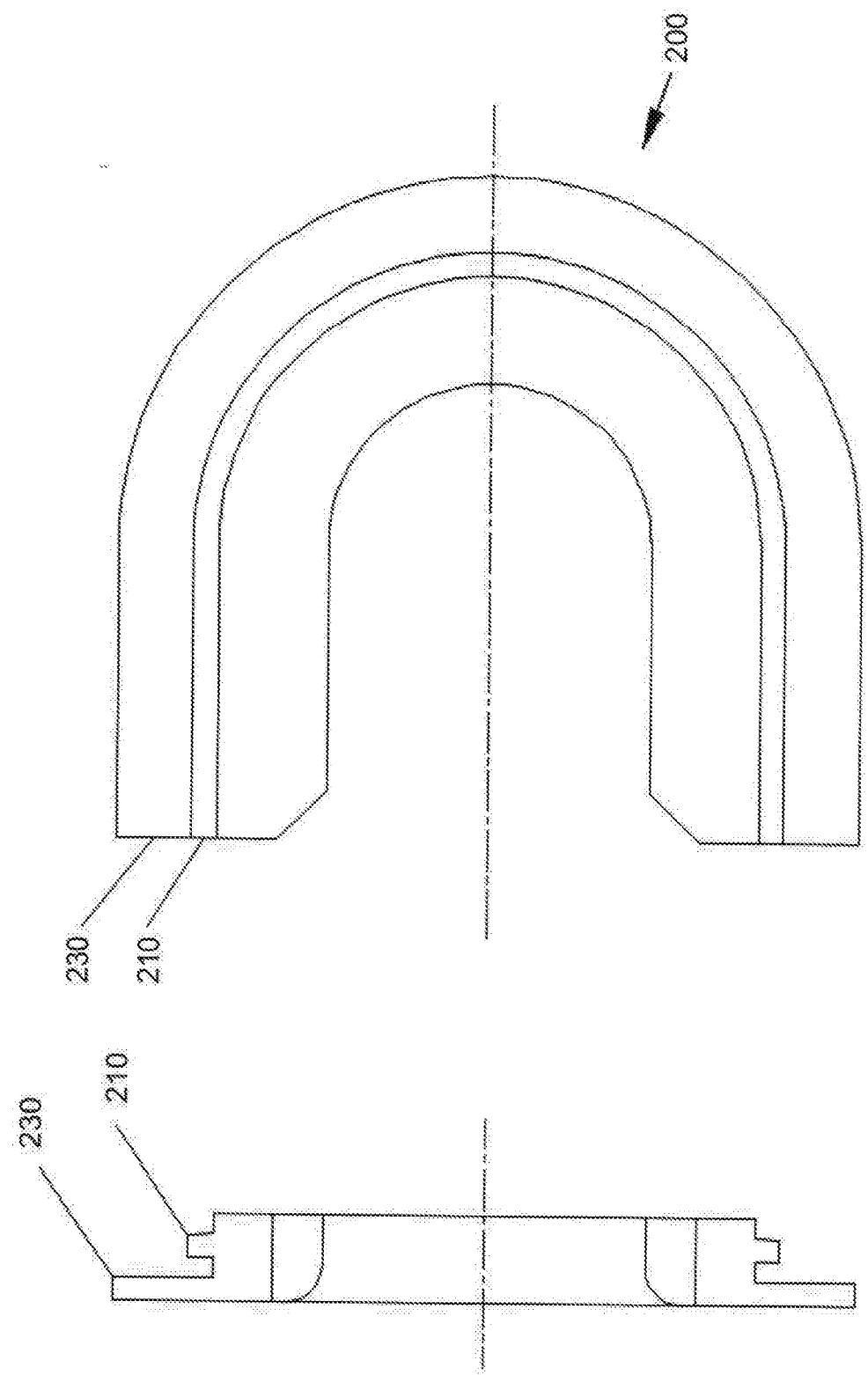
FIG. 2A is a view of a first side of a preferred adapter plate 200 of the present invention showing tongue 210 and adapter flange or lip 230.
FIG. 2B hereof is a front view of the adapter plate 200 of FIG. 2A hereof, showing the tongue, or projection, 210 which matches groove 220 of the rear plate 10 (FIG. 3 hereof), and showing flange 230, which provides the required spacing between the particular nominal size and ASME pressure class flange under test and the rear plate 10.

It is also within the scope of the present invention that a single adapter plate be used for more than one nominal flange pipe size, and ASME pressure Class as long as the sizes and pressure classes are within a relatively narrow size range for which an individual adapter plate was designed. The important thing is that the flange of the flanged item to be tested is large enough to be held in place by the adapter plate. In fact, for use with the simplest adapter plate illustrated in FIGS. 13A, 13B, and 17A hereof, multiple adapter plates can be inventoried, each for a particular nominal sized and ASME pressure Class flange. For more complex adapter plates, such as that illustrated in FIGS. 2A and 2B hereof, a single adapter plate can be designed for more than one pipe size. For example for both NPS 2 and NPS 3, wherein NPS refers to Nominal Pipe Size. Also, one size adapter plate can also be used for flanges of different ASME pressure classes, such as Class 150 and 300. A next larger size adapter plate can be used with ASME Class 600 flanges. It should also be noted that nominal pipe sizes refer to multiple size adjustment plates that can be kept on hand to cover a broad range of diameters. For example, one or more smaller adapter plates can be used for a range of smaller diameter flanged items, one or more medium sized plates can be used for flanged items in a so-called medium diameter range and one or more large sized plates can be used for a variety of large diameter flanged items. This is accomplished by use of a specific size adapter plate of the present invention illustrated particularly in FIGS. 2A and 2B hereof. Such pipe sizes are based on the U.S. standard for pipes in compliance with standards such as ASME B36.10M and ASME B36.19M, abbreviated NPS or Nominal Pipe Size. "Nominal" refers to the pipe in non-specific terms and identifies the diameter of the hole with a non-dimensional number, for example—2 inch nominal steel pipe, which comprises a variety of steel pipe with the only criterion being a 2.375 inch (60.3) outside diameter with differing wall thicknesses. Tables of standard nominal pipe sizes and wall thicknesses can be easily obtained via published standards and on the internet as well as in many engineering handbooks. Therefore, no further discussion is needed herein.

The present invention will be better understood with reference to the figures hereof. FIG. 1 hereof is an isometric front view of a preferred embodiment of testing apparatus of the present invention which is comprised of a slotted rear plate section 10 having a rearward facing flat surface 11 and front facing flat surface 13. The size of slot 15 of rear plate section 10 is sufficient to accept the flange and connecting part of the item to be tested, preferably a flanged pipe, but smaller than the diameter of the flange of the item so that the flange of the item will not slip through the slot during testing. By the term "flange and connecting part of the item" is meant that section of the flanged item wherein the item is secured, typically by welding, to the flange. The flange of the flanged item being tested is held securely against the front surface of the front face 13 of rear section 10 during testing. When an adapter plate of the present invention is used, the adapter plate will also be of sufficient size to prevent a smaller flange from slipping through the slot of the adapter plate. It is preferred that the flanged item to be tested be a flanged pipe or pipe section, such as that illustrated in more detail in FIG. 6 hereof. The size of slot 15 is not specific to the outside diameter of the pipe to which a flange is attached, but is more specific to the diameter of the area where the flange is secured, preferably by welding, to the pipe, or threaded thereon to the item to be tested. This will allow the apparatus of the present invention to be positioned (slipped) over and securely clamped to the flange of the flanged item to be tested.

Figure 8:
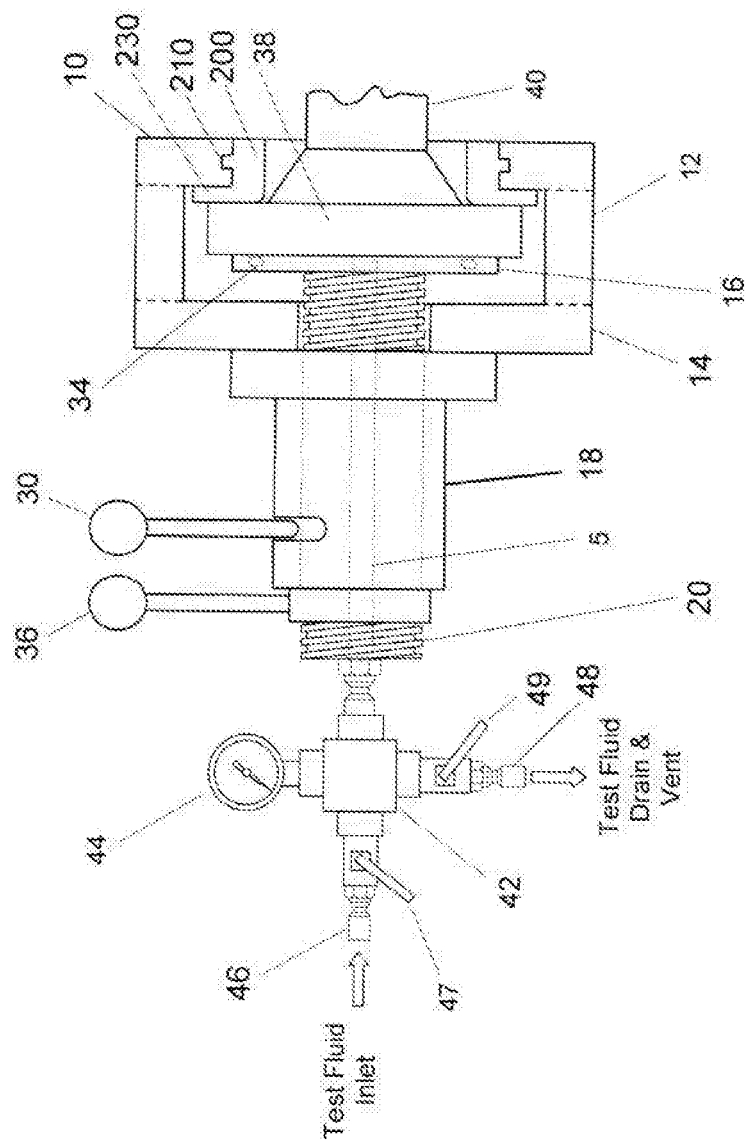
FIG. 8 hereof is a side view of a preferred apparatus of the present invention showing hydrostatic testing equipment attached to front end of a jackscrew and having a hollow passageway (conduit) 5 through its length and extending through the center of the blind flange for allowing test fluid to be conducted into and out of the flanged item being tested.
Figure 9:
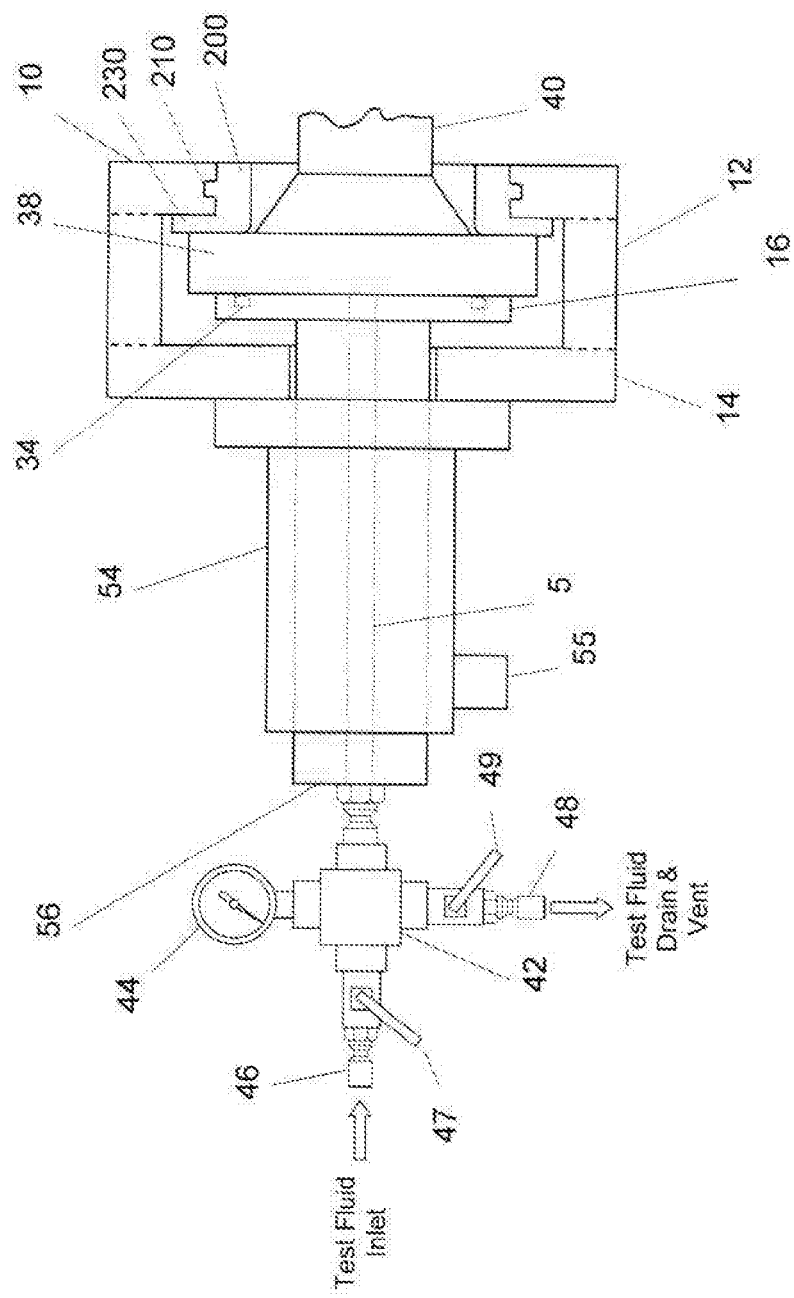
FIG. 9 hereof is a side view of a preferred apparatus similar to that shown in FIG. 8 hereof, but wherein the blind flange is operated by a means other than manually, which non-limiting means include a hydraulic means, a pneumatic means, electromechanical means, and magnetic means.
Figure 10:
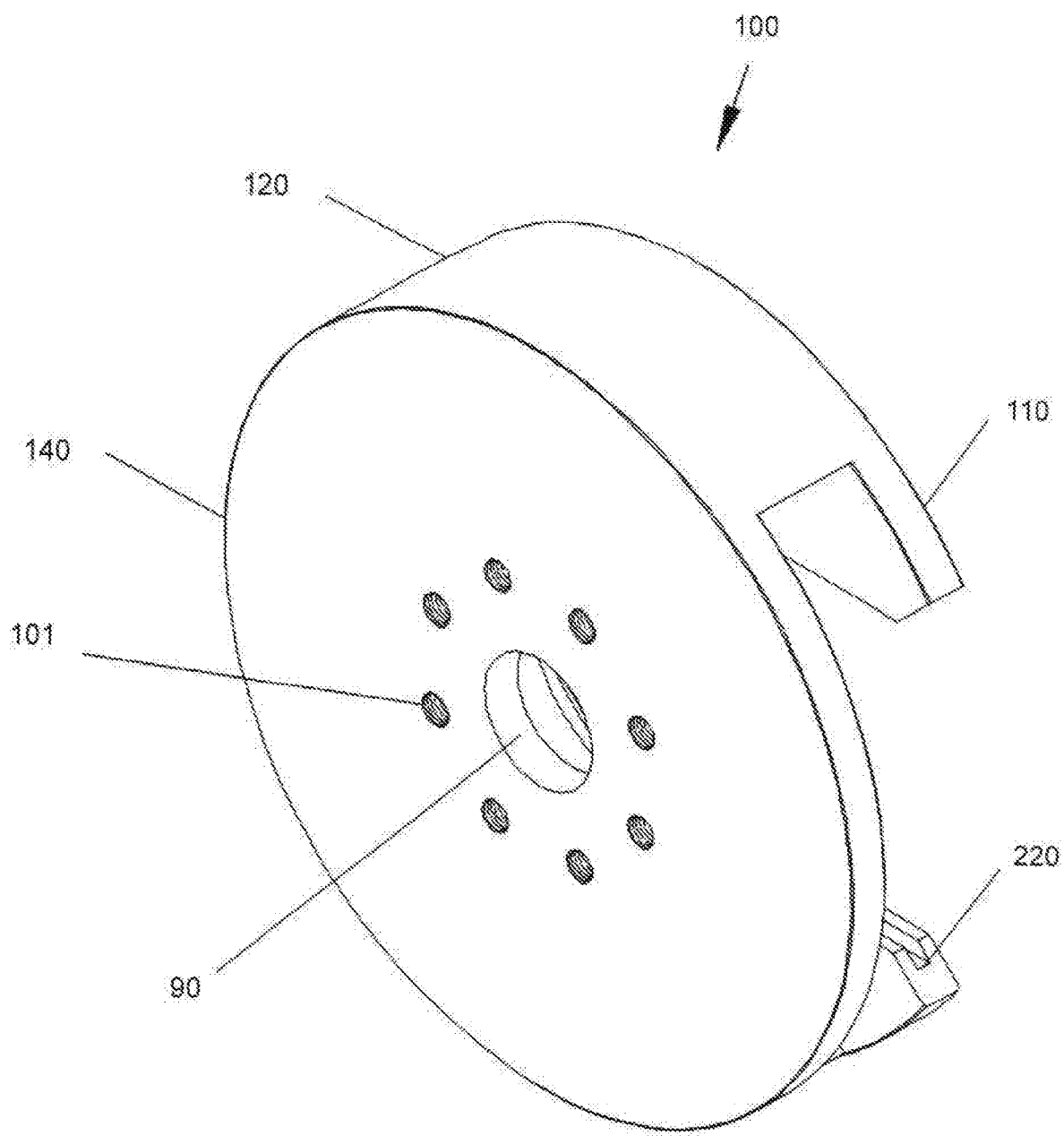
FIG. 10 hereof is an isometric front view of another preferred embodiment of the present invention, similar to that illustrated in FIG. 2 herein, but wherein the front section, the spacer (middle) section, and the rear sections are not individual component parts secured together. They are all sections, or areas, of a single unitary piece that is manufactured by a suitable method such as forging, casting, extruding, or machining.

There is also provided a front plate section 14, that is preferably circular, having at its center an annular opening 90 shown in FIG. 10 hereof, which opening can also be referred to as a through-hole. The diameter of the through-hole will be of sufficient diameter to allow unrestricted passage of axial actuator shaft that in one preferred embodiment can be piston rod 2, or in another preferred embodiment jackscrew 20 (FIG. 4 hereof). A blind flange 16 (FIG. 3 hereof) is secured to the rearward end of the actuator shaft, which shaft is capable of moving longitudinally (back and forth) between slotted plate section 10 and front plate section 14. The actuator shaft will include a conduit, or passageway 5, open from one end of the shaft to the other end of the shaft and through the center of blind flange 16 to allow for a test fluid to be conducted there-thru into the flanged item to be tested. A slotted spacer, or middle section 12, is located between slotted rear plate section 10 and front plate section 14. Slotted middle section 12 is of sufficient width W that defines cavity 3 (FIG. 5 hereof) between these two (front and rear) plate sections. Width W is of a sufficient dimension so that blind flange 16 (FIG. 3 hereof) and flange 38 (FIG. 6 hereof) of a flanged item to be tested can fit within cavity 3 (FIG. 5 hereof) with enough room so that blind flange 16 can be engaged and disengaged against the flange of the flanged item to be tested. It will be understood that one or more of slotted rear plate-like section 10, slotted middle section 12, and circular front plate section 14 can be separate individual pieces secured to one or more neighboring sections by any suitable securing means, preferably by use of bolts. It is within the scope of this invention that any two or all three sections can be fabricated as a single piece. FIGS. 1 to 9 hereof show the embodiment of the present invention wherein all three sections are individual sections secured together by a suitable means. FIGS. 10-12 and 14-17 hereof show another preferred embodiment of the present invention wherein all three sections are fabricated as a single unit manufactured by any suitable process. Nonlimiting example of processes to manufacture the single unit include forging, casting, extruding, and machining.

Blind flanges are well known in the art and are typically comprised of a solid disk that can be pressed against a flanged opening to block and seal the opening. A suitable gasket material is typically positioned between the blind flange and the flange of the flanged item to be tested to form an adequate pressure seal. It will be noted that the apparatus of the present invention can be used at both ends of the flanged item to be tested. For example, lengths of piping having a flange at both ends can have an apparatus of the present secured to each flanged end. It is preferred that one end of the flanged piping have secured thereto an apparatus of the present invention that contains hydrostatic testing equipment, such as a pressure gauge and suitable valving to allow for the introduction and release of air and testing fluids. The opposite end will preferably have secured thereto another apparatus of the present invention. This apparatus at said opposite end will also contain an actuator and actuator shaft as previously described herein, but will preferably also contain a valve to release air from the flanged item to be tested when a testing fluid in introduced. Of course, the testing fluid used to pressurize the flanged item to be tested can be released from either or both ends.

Blind flange 16 will preferably contain at least one gasket, more preferably at least one O-ring or a plurality thereof, and preferably embedded into a corresponding annular groove(s) machined, pressed, cast, or forged into the mating surface of the blind flange. The mating surface is the surface that will be sealingly pressed against the surface of the flange sufficient to energize the O-ring or plurality thereof of the flanged item to be tested to create an adequate seal against test pressures. While a conventional blind flange will typically include mounting bolt holes around its perimeter to enable it to be secured to the flange of the flanged item to be tested by means of traditional bolting methods, blind flange 16 of the present invention will not have such holes. It will instead be activated against the flange of the flanged item to be tested by advancing the actuator shaft 2 or 20 (FIG. 4 hereof) so that a gasket, which will preferably be one or more O-rings (34 of FIG. 3 hereof) is energized against the surface of the flange of item to be tested.

As previously mentioned, FIG. 1 hereof also shows an axial non-obstructed passageway 5 through actuator shaft 2, or jackscrew 20, as applicable and through the center of blind flange 16. Passageway 5 is used to conduct testing media, which in most cases will be water and air, into and out of the flanged item to be tested. It is preferred that the interior of the front or outer end of this passageway be threaded to allow for the attachment of hydrostatic testing equipment, such as valves, manifolds, quick connect fittings, pressure gauges, etc. Non-limiting examples of preferred testing equipment include a pressure gauge, a fill valve, and a vent valve, as shown in FIGS. 8 and 9 hereof. FIGS. 8 and 9 also show a pipe nipple 46, or quick-connect coupling device, both of which are well known and accepted in the art.

An actuator means is provided for supporting and actuating actuator shaft 2 in both longitudinal directions to engage and disengage blind flange 16 against the flange of the item to be tested. An unlimited example, and a preferred manual actuating means is use of a jackscrew 20 shown in FIGS. 4-8, and 15 and 16 hereof. Non-limiting examples of non-manual actuating means include hydraulic, pneumatic, electrical, and/or a magnetic. The actuator housing is shown as item 18 for a jackscrew arrangement and as item 54 for the non-manual actuating means. The actuator is secured to front circular plate 14 by use of any suitable securing device, preferably bolts 26. It will be understood that jackscrew nut, or hub, 18 can be integrally manufactured with circular plate 14 into a single unit, or attached by means of a press fit or bolts. FIGS. 4 to 8 hereof show activating rod 2 as a jackscrew 20 which can be manually turned by use of lever 30 to move blind flange 16 against a flange of the flanged item being tested, then locked into place by means of lever 36. It will be noted that although O-rings are not shown in some of the figures hereof, a sealing means of any suitable type will need to be provided before any flanged item to be tested is pressurized for testing.

Jackscrews are well known in the art and are generally defined as threaded screws that can be turned to adjust the position of an object into which it fits. Such a means will be able to move blind flange 16 against the sealing face of the flange of the flanged item being tested and to release it from the face of said flange to allow the apparatus of the present invention to be removed and used on another flanged item to be tested.

As previously mentioned, slotted rear plate section 10, slotted spacer 12, and front plate section 14, if individual pieces can be secured to each other by any suitable means. Non-limiting examples of suitable means for securing any combination of these parts together include bolts 17, or nuts and bolts, welds, adhesives, and or interference press fits. Interference press fits are well known in the art and are typically referred to as a fastening between two parts that is achieved by friction after the parts are pushed together, rather than by any other means of fastening. Preferred is the use of bolts of sufficient length to be screwed through all three sections through matching bolt holes or having matching threaded bolt holes located around the periphery of each part. It is within the scope of this invention that these individual parts can be fabricated as a single unit comprised of all three sections by any suitable means, such as forging, casting, extrusion, or machining, or any other suitable technology. There can also be provided an optional handle 24 of any suitable design to aid in positioning and removing the apparatus of the present invention to and from the flanged item to be tested. There can also be provided one or more lifting eyebolts (not shown) or lifting padeyes (not shown) attached to any suitable location of the apparatus of the present invention by means of screw threads, welded, press fit, or through the use of adhesives, and/or integrally forged, cast, or extruded to enable the apparatus of the present invention to be positioned with use of powered lifting equipment.

FIG. 2A hereof is a view looking toward the open end of the U-shaped adapter plate 200 of the present invention. Tongue 210, which can also be referred to as projection or tab, is designed to match groove 220 of rear plate section 10 (FIG. 3) so that the adapter plate can be inserted and seated into the groove so that the apparatus of the present invention can be used for targeted flanged pipe sizes too small for use with the basic clamping apparatus (annular cavity) without the use of an adapter plate. Lip, or flange, 230 is designed to rest against the back surface of the flange to be tested. Testing of different size and pressure Class flanges (different thickness flanges) are accommodated by use of the present invention by means of different adapter plates that have different lip or flange (230) thickness. The adapter plates, which can also be referred to as size and pressure Class adapter plates or adjustment plates and can be manufactured from any material previously mentioned for the manufacture of the basic parts of the testing apparatus of the present invention. FIG. 2B is a side view adapter plate 200 of the present invention. By adapter plate, we mean that without use of an adapter plate, a given apparatus of the present invention would only be able to be used for the single, or very narrow range of flange sizes and/or pressure Classes, for which the apparatus was designed. Flanged pipe sizes smaller than the size designed for the base clamping apparatus would typically not be able to be safely tested and pipe sizes larger would not be able to be accommodated. Consequently, using a size adapter plate of the present invention designed for smaller diameter pipe sizes vastly improves the range of pipe sizes and usefulness of a given clamping apparatus.

Figure 3:
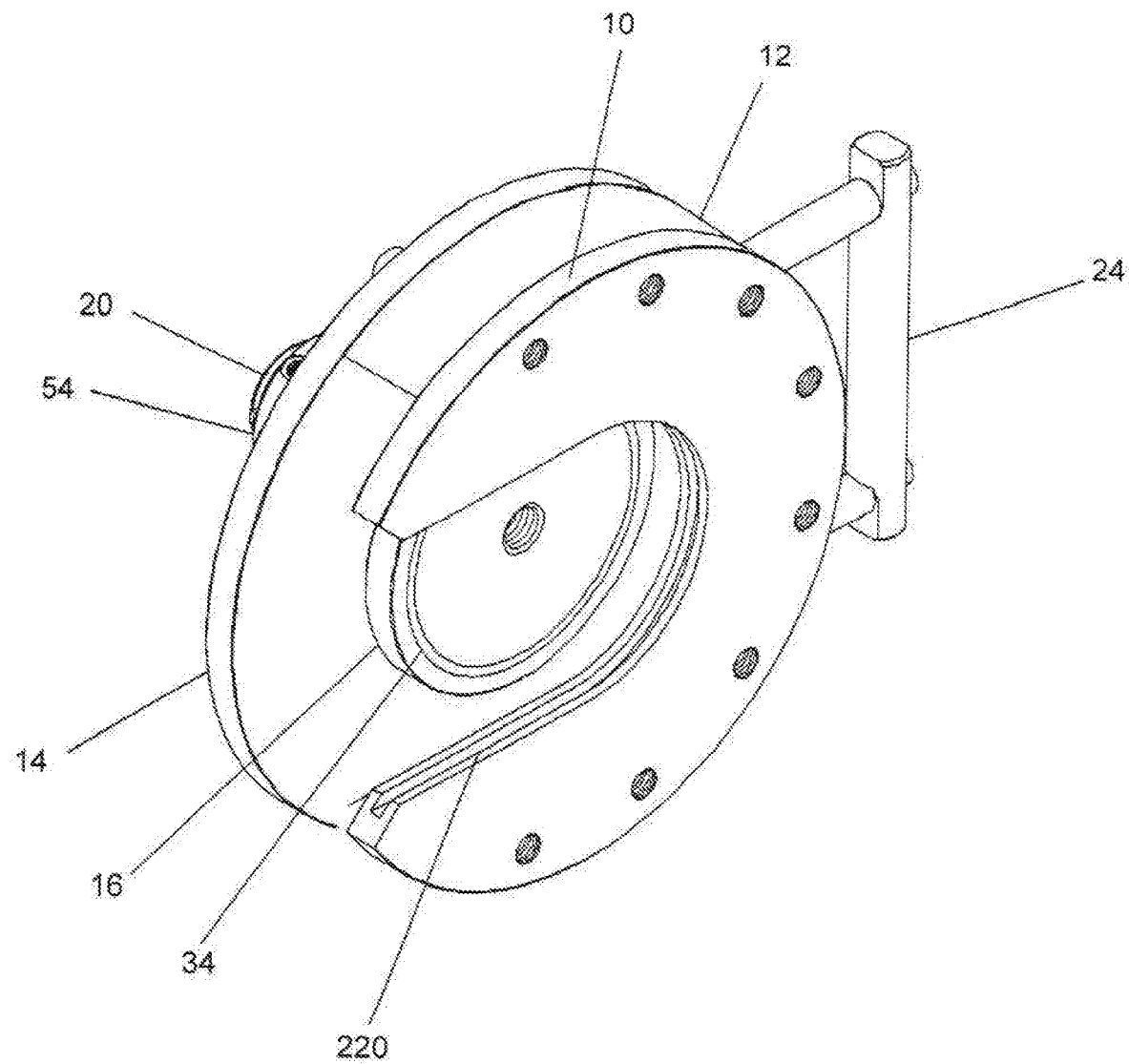
FIG. 3 hereof is an isomeric view of the rear of a preferred testing apparatus illustrated in FIG. 1 hereof showing a blind flange (16) having an O-ring (34) partially embedded in a corresponding annular groove, which O-ring is capable of establishing a substantially leak-proof pressure-seal when pressed against the flange of a flanged item to be tested. Also shown is groove 220 for receiving tongue, or projection, 210 of adapter plate 200.
Figure 4:
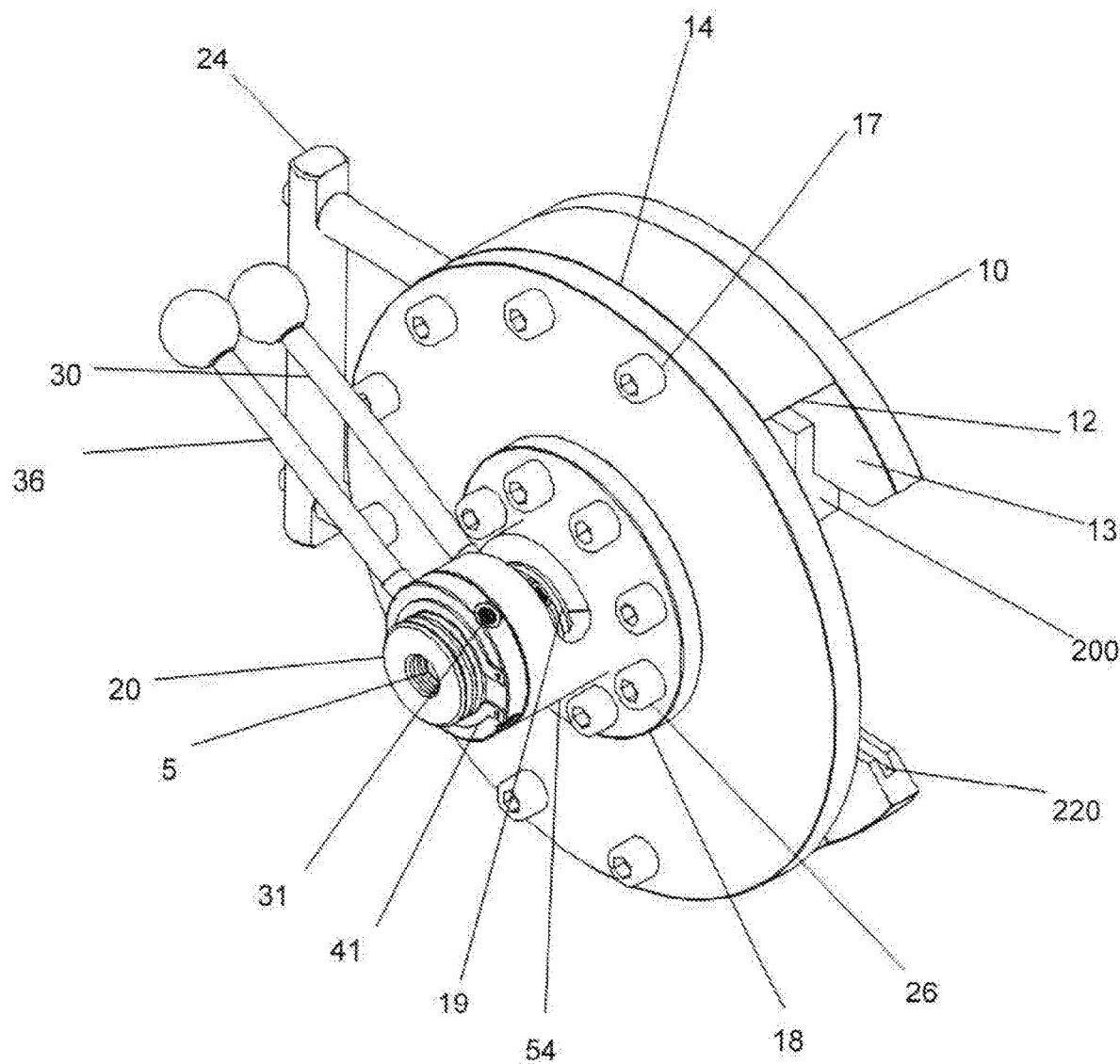
FIG. 4 hereof is an isomeric view of the front of a preferred apparatus of the present invention, but showing a jackscrew assembly as a manual actuator means for advancing and retracting blind flange 16 into and out of a sealing contact against the flange of a flanged item to be tested.

FIG. 3 hereof is an isometric view of back of the preferred embodiment of FIG. 1 hereof, but showing one preferred sealing means as O-ring 34 comprised of a suitable sealing material, preferably an elastomeric material embedded in a corresponding annular groove around the outer face of blind flange 16. The O-ring is positioned so that a portion of it extends an effective distance above the face of the blind flange to enable it to be compressed against the surface of the flange of the flanged item to be tested to result in a leak-proof seal during testing. It will be understood that more than one O-ring, or other type of gasket, can be used so that there can be multiple sealing surfaces during high pressure testing. For example, a flat gasket of suitable sealing material can be used between blind flange 16 and flange 38 (FIG. 6), of the flanged item to be tested. While an elastomeric material is preferred, the gasket or O-ring, can be fabricated from a material such as vegetable fiber, plastic, etc. as previously discussed herein. Any sealing arrangement of the present invention can also fit into a packet of some other suitable form that is integral with, or machined into, blind flange 16. FIG. 3 hereof also shows the rear plate section 10 having a continuous integral groove 220 along its inner cutout edge to receive tongue 210 of adapter plate 200, in a tongue and groove arrangement.

FIG. 4 hereof is an illustration of the preferred embodiment of FIGS. 1 and 3 hereof but showing a manual means for actuating blind flange 16. This manual means is shown as a jackscrew 20 and jackscrew nut 18 which is secured to circular front plate 14 by a plurality of bolts 26. As previously mentioned, blind flange 16 is actuated and locked into place by use of two levers 30 and 36. Lever 30, is preferably secured directly to jack screw 20, and is used to advance the blind flange 16 so that it sealingly presses against the face of flange 38 shown in FIG. 6 hereof. This compresses one or more O-ring seals or other gasket or sealing material and energizing it such as to provide an adequate seal while being constrained in the O-ring groove or seal pocket. All such sealing mechanisms and devices are well known in the art. Lever 36, which is secured to lock-ring 41, which itself is secured to jack screw 20 by locking screws 31, is used to lock jack screw 20 into place to prevent inadvertent movement of blind flange 16 away from the flange of the flanged item being tested. Such a feature is considered desirable for safety reasons, particularly while testing at high pressures and/or while using a gaseous test media. As such, the locking step is more of an added safety feature to prevent back-slipping, but this embodiment of the apparatus of the present invention can be successfully operated with use of only lever 30. In other words, it is preferred that both levers be used. It will be noted that jack screw nut 18 contains a cutout 19 of suitable dimensions to allow levers 30 and 36 to travel clockwise and counter-clockwise during engagement and disengagement of blind flange 16.

Figure 5:
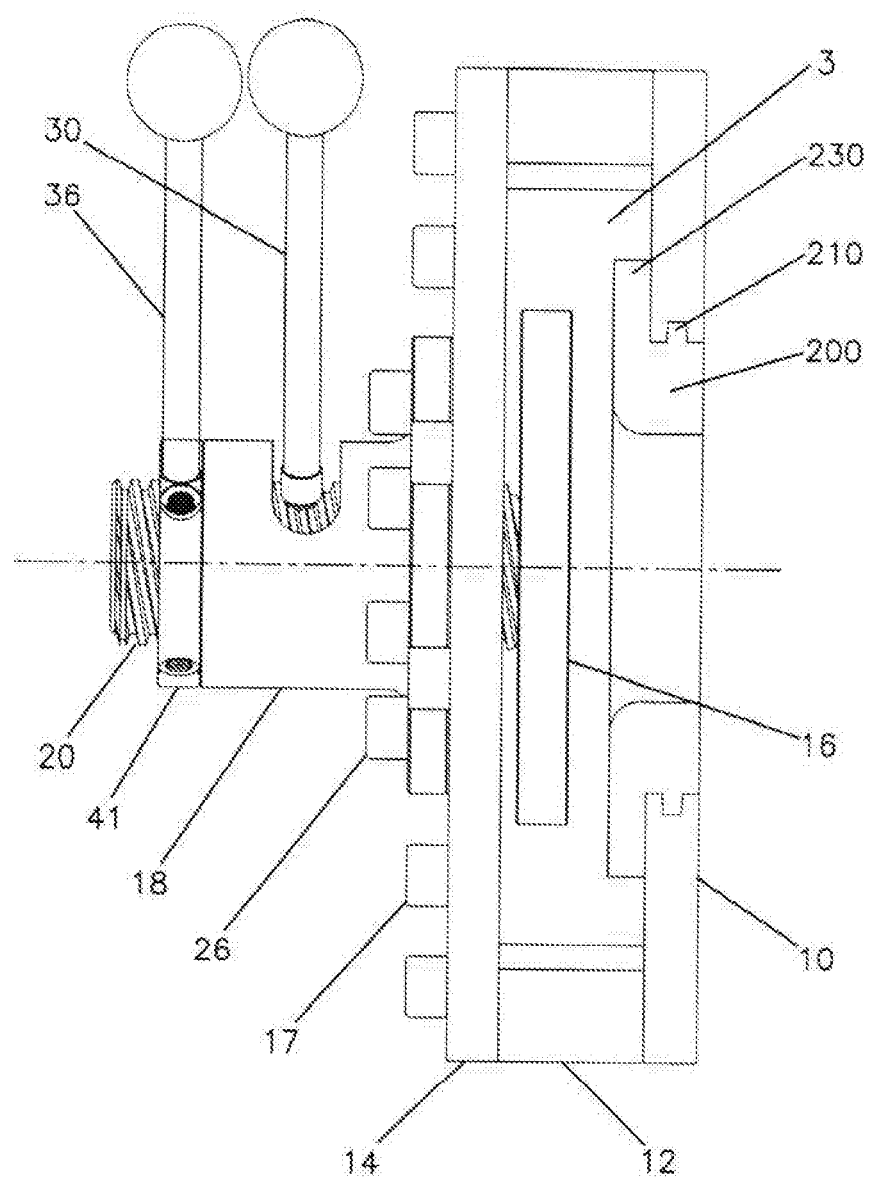
FIG. 5 hereof is a side view of the preferred embodiment illustrated in FIG. 4 hereof showing the blind flange not engaged against a flange of a flanged item to be tested but showing an open-side view of adapter plate 200 inserted into groove 220 of rear plate 10 of the apparatus of the present invention.

FIG. 5 hereof is a side view of the embodiment of FIG. 4 hereof showing cavity 3 defined by the width W (FIG. 6 hereof) of slotted spacer section 12. This FIG. 5, as well as FIG. 6 hereof, also shows lock ring 41 which is secured to lever 36. Size adapter plate 200 is shown secured in position to rear plate 10 by use of a tongue 210 of the size adapter plate 200 and groove 220 of rear plate 10. Lip, or adapter flange, 230 is shown secured against the front facing surface 13 of rear plate section 10. It will be noted that the terms "rear plate" and "rear plate section" are sometimes used interchangeably herein since the front plate section 14 and middle section 12 and rear section 10 can be either separate plates secured together by any suitable means, or can all be sections of a single piece having the three sections comprising a single physical unit.

Figure 6:
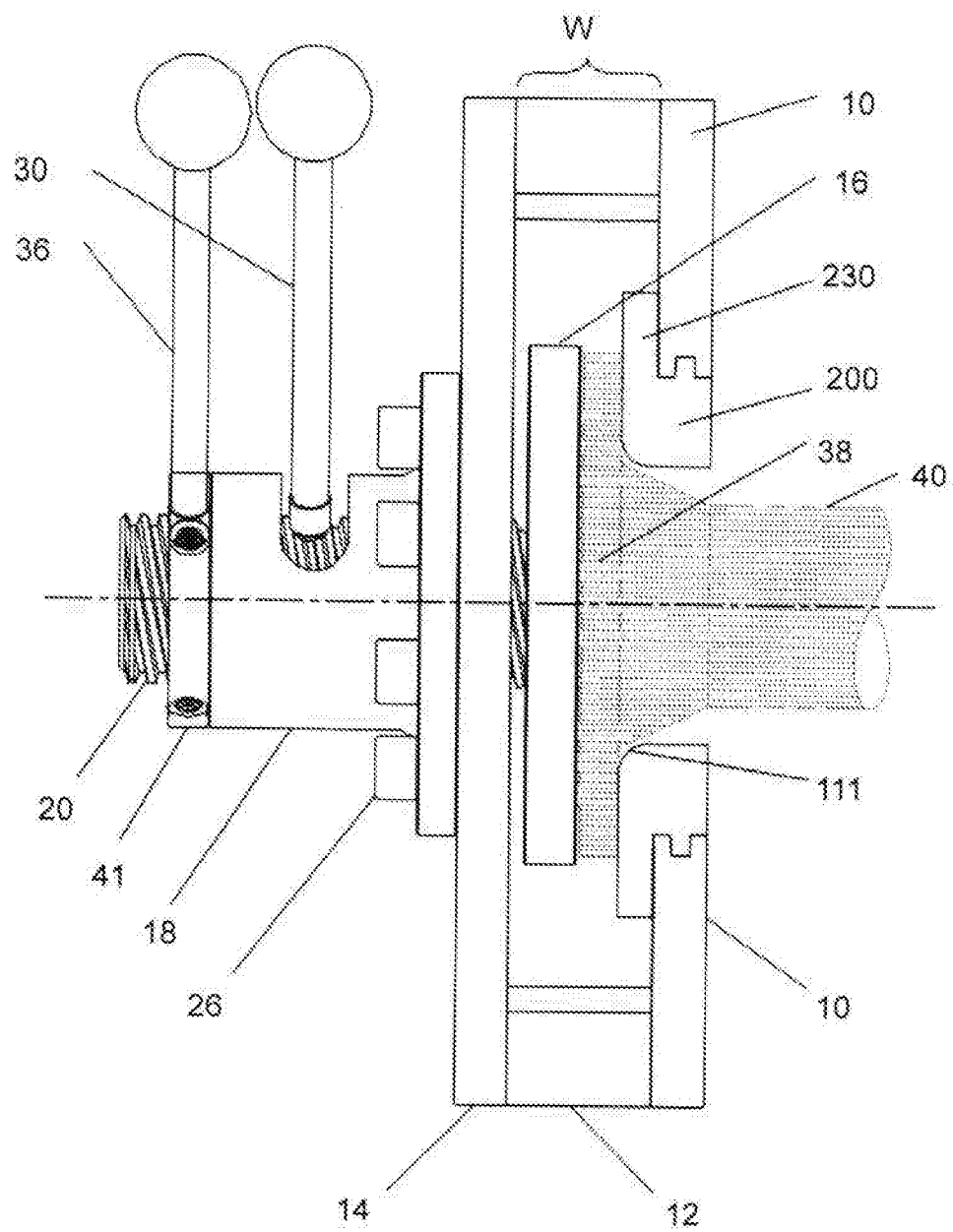
FIG. 6 hereof is the same side view as illustrated in FIG. 5 hereof, but showing the blind flange engaged and secured against flange (38) of a flanged pipe (40) to be tested, thus forming a fluid-tight seal. Also shown is the flange of the pipe to be tested pressed against an adapter plate flange 230.

FIG. 6 hereof is the same side view illustration of FIG. 5 hereof, but showing flange 38 affixed to the pipe, hose, or equipment 40 to be tested. FIG. 6 hereof shows blind flange 16 in sealing contact with flange 38 sufficiently to energize an O-ring or gasket seal (not shown), or any other suitable fluid sealing material against the face of flange 38. It will be noted that it is preferred that that portion of adapter plate 200 that contacts in the vicinity of where pipe 40 is secured to flange 38 contains a radiused edge 111 that will effectively compensate for the radiused portion of the flange hub. FIG. 6 hereof also illustrates the adaptability of the present apparatus wherein it is shown that adapter plate 200 is used to accommodate pipes and flanges of smaller diameter than would otherwise be acceptable if no adapter plate were used.

Figure 7A:
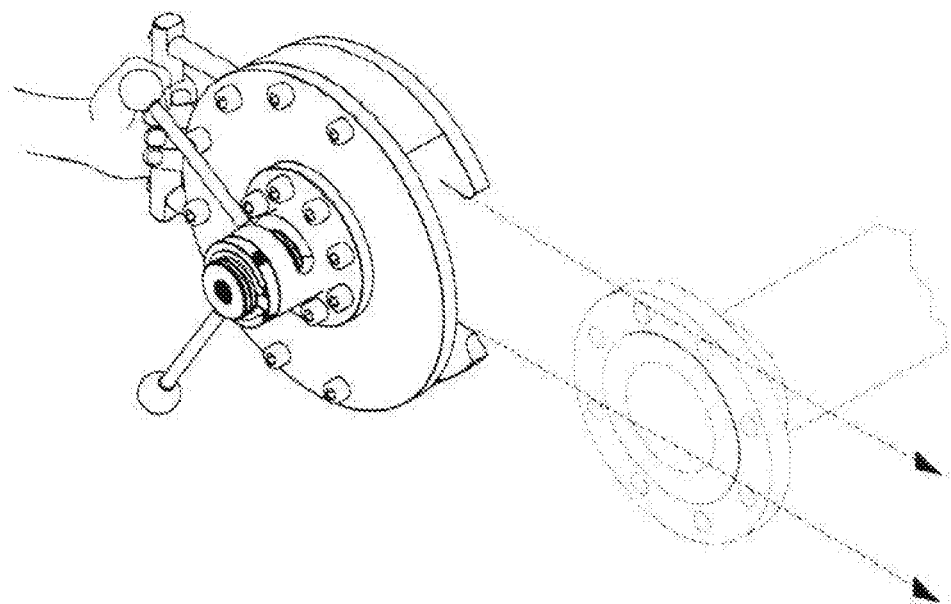
FIG. 7A hereof is an isomeric view of the apparatus illustrated in FIG. 4 hereof being slipped over the flange of a flanged pipe to be hydrotested. The two dashed lines ending with arrows indicates movement of the apparatus of the present invention into place over a flange of a flanged pipe.
Figure 7B:
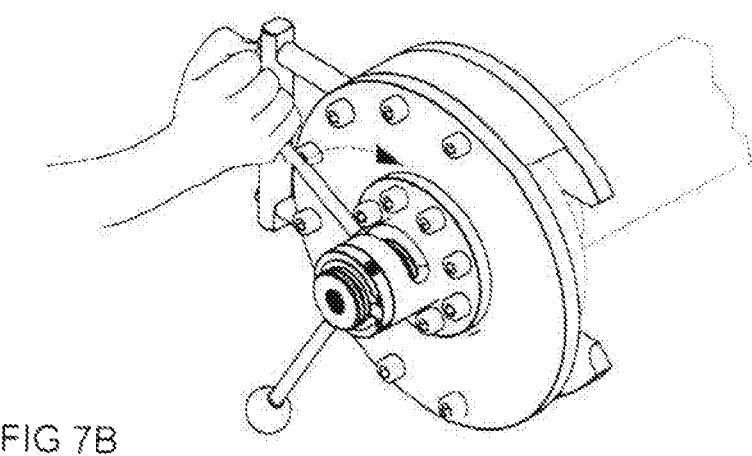
FIG. 7B hereof is an isomeric view of the apparatus illustrated in FIG. 4 hereof, that has already been slipped into place onto the flange of a flanged pipe to be tested. This Figure also shows the blind flange being manually activated by use of a lever that is rotated to advance a jack screw, thus engaging the blind flange against the flange of the flanged pipe to be tested.

FIGS. 7A and 7B are simplified illustrations showing how a preferred embodiment of the present invention represented in FIGS. 4, 5 and 6 hereof can be easily slipped into place over the flange of a flanged item to be tested and secured in place. Individual parts of the apparatus are not labeled in these two Figures because all have already been identified in at least two previous figures hereof.

FIG. 8 hereof is a more detailed view of the embodiment illustrated in FIG. 6 hereof, but showing the internal passageway 5 through jack screw 20 and through the center of blind flange 16, which passageway serves to deliver testing fluid into the flanged item to be tested. FIG. 8 also shows a test manifold 42 and conventional equipment used for hydrostatic testing which includes pressure gauge 44, inlet valve 46 and inlet control handle 47, for controlling the flow of fluid into the item to be tested and outlet valve 48 and outlet control handle 49 for removing test fluid from the flanged item that was tested. It will be noted that in all figures, jack screw 20 is just one embodiment of actuator shaft 2, which will preferably extend past the jack nut or actuator.

FIG. 9 hereof shows an apparatus of the present invention similar to that shown in FIG. 8 hereof, but where the blind flange actuator 55 is not manually operated, but which can be activated hydraulically, pneumatically, electrically or magnetically. Such types of actuators are well known in the art and are used daily worldwide in myriad applications around the world. Thus, no further discussion of such devices is needed herein for one having at least ordinary skill in the art to reproduce and appreciate the advantages of the apparatus of this invention.

FIG. 10 hereof is a representation of a single forged, cast, machined, or extruded unit 100 comprised of the three integral sections, the slotted rear plate-like section 10, slotted spacer section 12, and front plate section 14. Because the apparatus of FIGS. 10 and 11 hereof are the three sections manufactured from a single piece of material and comprising the three sections are numbered 110, 120, and 140. The single unit designed illustrated in FIGS. 10 and 11 also show groove 220 for receiving tongue 210 of adapter plate 20. Threaded holes 101 are also shown for attaching the actuator. Also shown is annular opening 90.

FIG. 11 hereof illustrates a single unit construction containing three sections 110 (rear slotted section), 120 (spacer section) and 140 (front plate section) which of course corresponds to the individual parts of FIGS. 1-9. FIGS. 10 and 11 also show annular opening 90 for receiving activator rod 2 or jack screw 20, as well as showing treaded holes 101 for receiving corresponding threaded bolts. Groove 220 is also shown along the inside edge of rear plate section 110 to accommodate the tongue, or projection 210, of adapter plate 200. It will be noted that tongue 210 can also be referred to by any other suitable term, such as a tab, or projection.

Figure 12:
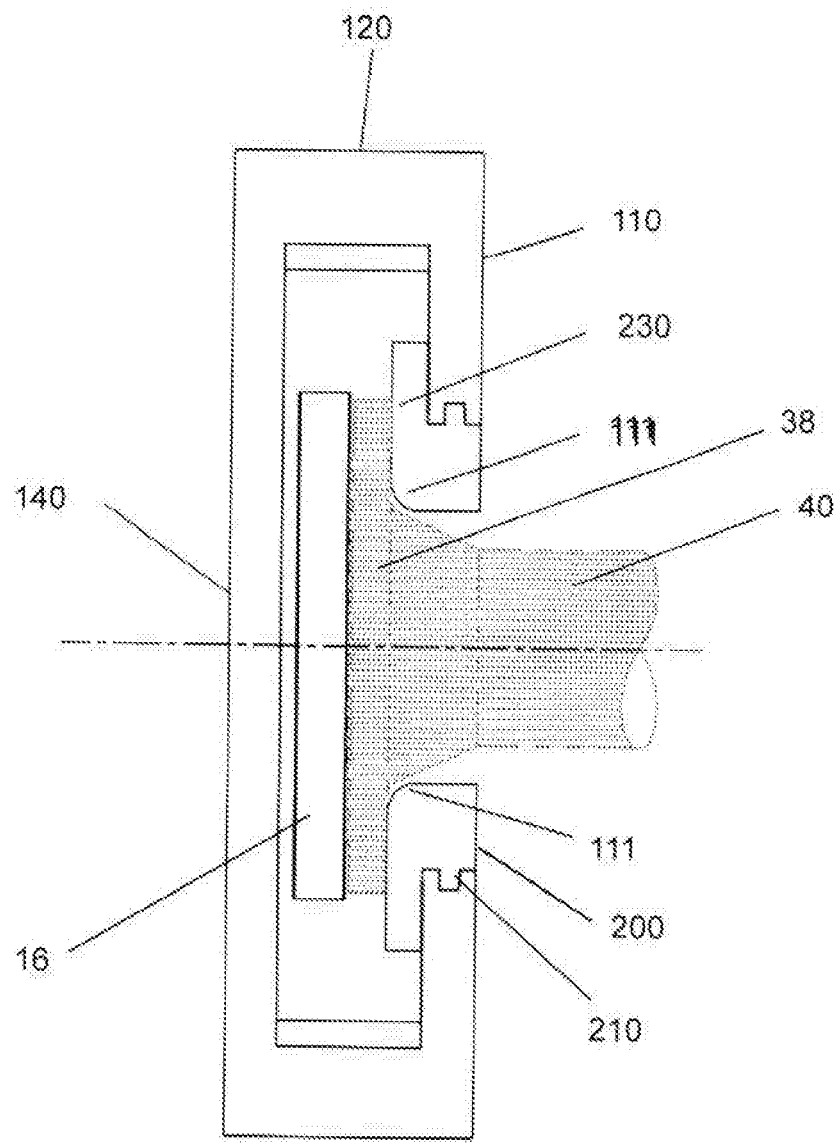
FIG. 12 hereof is a side view of the apparatus of FIGS. 10 and 11 hereof but showing adapter plate 200 inserted into groove 220 of rear plate section 110 to act against flange 38.

FIG. 12 hereof is a side view of the single unit structure of FIGS. 10 and 11, but showing use of the adapter plate 200 of the present invention with a flanged pipe positioned in position for testing. An actuator is not shown in this figure because it has already been shown in at least one previous figure.

Figures 13A, 13B, 13C:
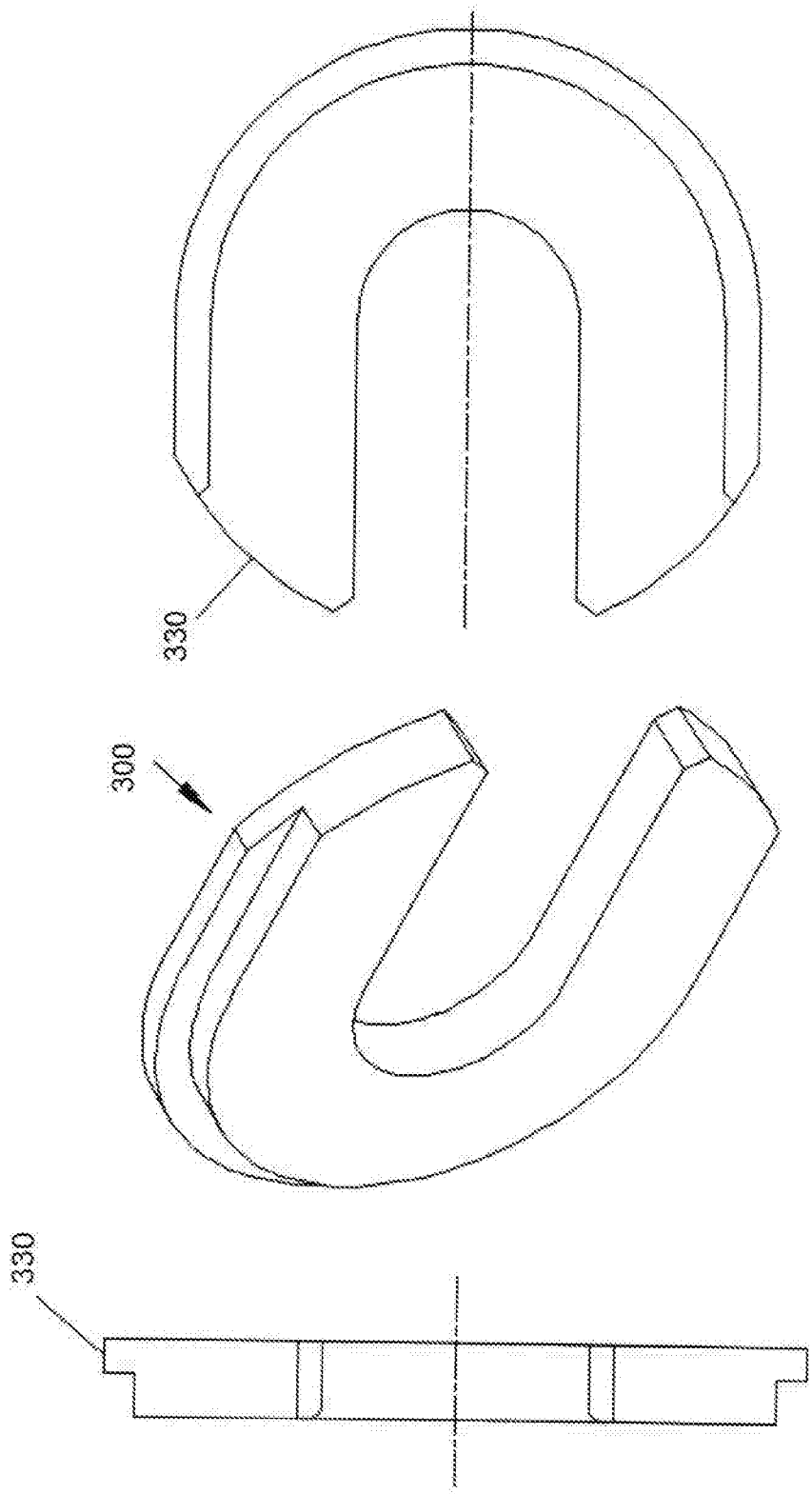
FIGS. 13A, 13B, and 13C hereof are three different views of adapter plate 300 of the present invention showing lip, or flange section 330 which can be slid into place in groove 320 of the apparatus of FIG. 14.

FIG. 13A-13C are three views of another, and more preferred, embodiment of the adapter plate 300 of the present invention showing flange 330 of suitable dimensions to fit groove 320 (FIG. 14 hereof) for securing the adapter plate in place during testing.

FIG. 14 hereof is an isometric view of another version of a single unit comprised of the three structural sections: front, middle, and rear but showing groove 320 for receiving flange 320 of adapter plate 300 shown in FIGS. 13A-13C.

Figure 15:
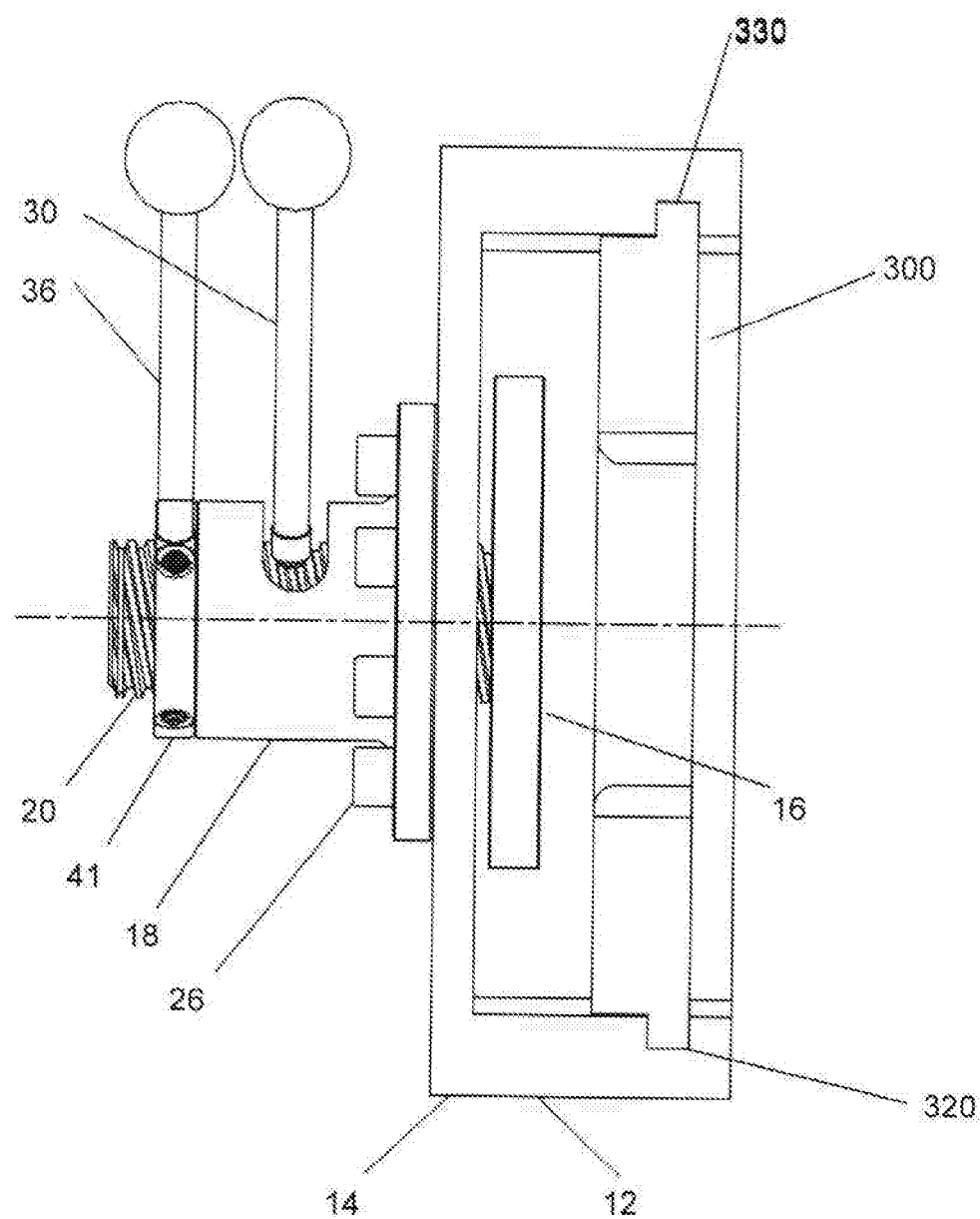
FIG. 15 hereof is a side view of a preferred embodiment of a jackscrew single unitary clamping housing showing blind flange 16 not engaged against a flanged opening of a flanged item to be tested but showing an open-side view of adapter plate 300 inserted into groove 320.

FIG. 15 hereof shows a jackscrew apparatus similar to that illustrated in FIG. 8 hereof but where the basic sections (rear plate, middle section, and front plate) are part of single unit of FIG. 14 hereof.

Figure 16:
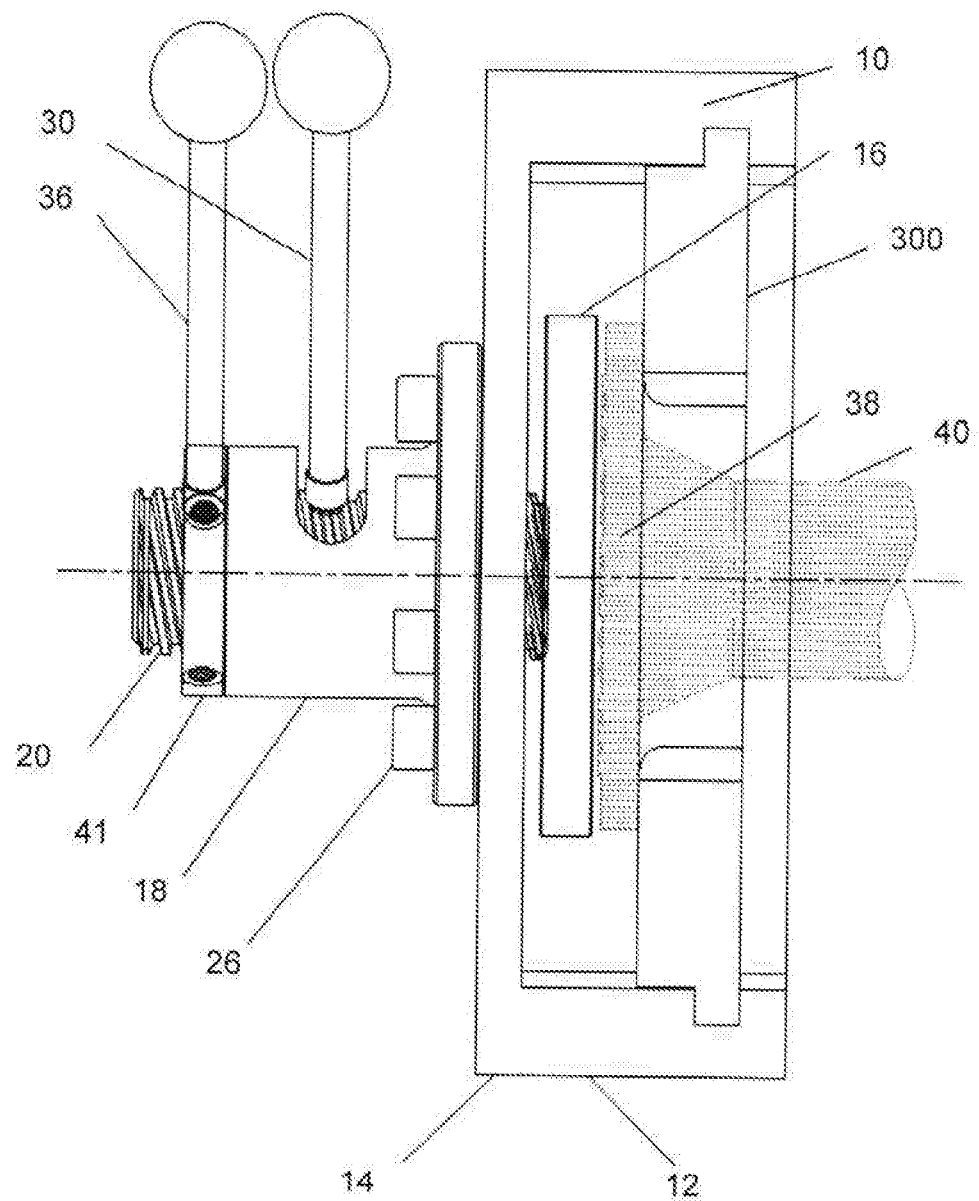
FIG. 16 hereof is the same side view as illustrated in FIG. 15 hereof, but showing blind flange 16 engaged and sealingly secured against flange 38 of a flanged pipe 40 to be tested. Also shown is the flange of the pipe to be tested pressed against an adapter plate 300.

FIG. 16 hereof is the same apparatus of FIG. 15 hereof but showing a flanged pipe in place in the apparatus and blind flange 16 activated against flange 38 of the flanged pipe awaiting pressure testing.

Figure 17A:
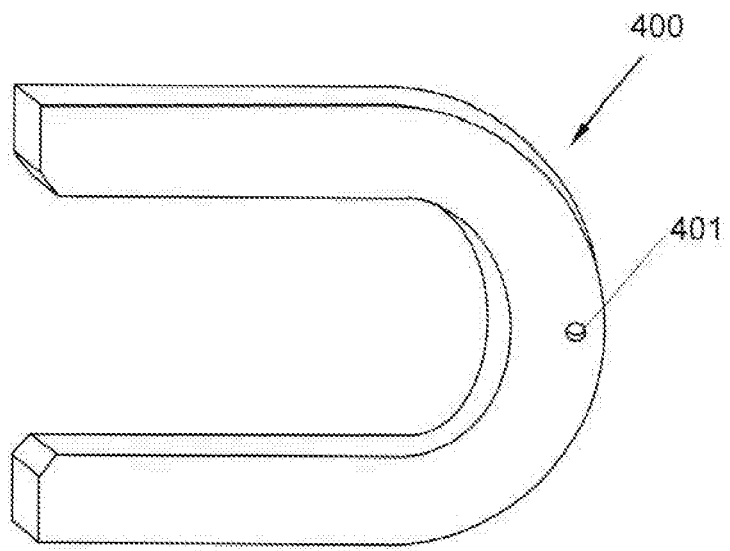
FIG. 17A hereof is an isometric view of another preferred adapter plate 400 of the present invention showing a single hole 401 for receiving a pin 402 to secure it within slot or groove 420 to an apparatus similar to that illustrated in FIG. 17B.

FIG. 17A hereof is an isometric view of another, and more preferred, embodiment of the adapter plate 400 of the present invention showing hole 401 which will match a hole in testing apparatus so that the adapter plate can be secured in place with use of pin 402. It will be understood that although this FIG. 17B shows only one hole any number of holes can be used as long as the physical integrity of the adapter plate is not compromised.

Figure 17B:
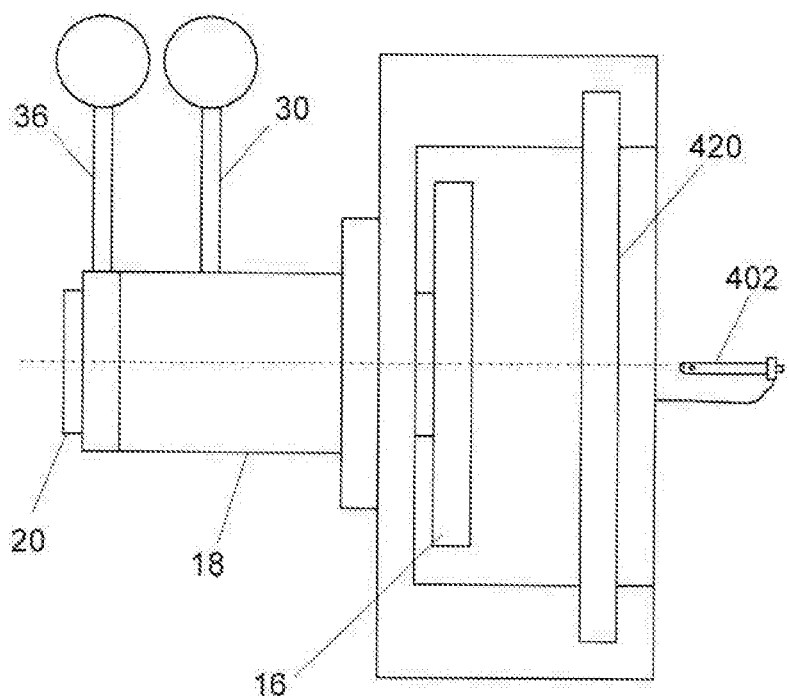
FIG. 17B hereof is a side view of a jackscrew singe unitary clamping housing similar to that of FIG. 15 hereof but showing slot, or groove 420 capable of receiving adapter plate 400. This figure does not show the adapter plate positioned in groove 420.

FIG. 17B shows a simplified jackscrew single unit apparatus similar to that shown in FIG. 16, but with groove or slot 420 for receiving adapter plate 400.

What is claimed is:

1. An apparatus for sealing a flanged opening of a flanged item to be hydrotested, which apparatus is comprised of:
   a) a rear plate section having a slot defining a C-shape for receiving a flange of a flanged opening to be sealed;
   b) a front circular plate section having a through-hole at its center for receiving a shaft capable of longitudinal movement;
   c) a middle section also having a slot defining a C-shape for receiving a flange of a flanged item to be sealed, which middle section having a first side and a second side and secured at its first side to said rear plate section and secured at its second side to said front section, wherein all three of said rear plate section, said middle section and said front section all have substantially the same radius of curvature and wherein all three sections when joined together form an annular cavity;
   d) an elongated shaft having a front end and a rear end, said rear end extending through said through-hole of said front circular plate and into said annular cavity;
   e) a blind flange having a first face and a second face which second face is secured at its center to said rear end of said elongated shaft and wherein said first face contains a ring of sealing material embedded into its face but extending an effective distance away from said face to be capable of being compressed against said face to form a fluid-tight seal when pressed against a flange of a flanged opening to be sealed, and wherein there is provided an open passageway through the entire length of said elongated shaft and through the center of said blind flange to allow a fluid to pass through said elongated shaft and blind flange;
   f) wherein the width of said annular cavity is defined by the width of said middle section which width is sufficient to allow enough room for the flange of a flanged opening to be sealed and for said blind flange to be moved into and out of sealing contact with said flange of a flanged opening to be sealed;
   g) an actuator secured to said front surface of said circular front plate, which actuator, when actuated is capable of horizontally moving said shaft and blind flange in an out of contact with a flange of the flanged opening to be sealed; and
   h) a removable adapter plate having substantially the same radius of curvature as said annular cavity and having a slot capable of accepting a targeted flanged item to be tested, which removable adapter plate is mechanically held in position between the front face of said rear plate section and said flange of a flanged item to be tested.

2. The apparatus of claim 1 wherein said rear plate section, said front circular plate section and said middle section forming said annular cavity are separate items that are secured together by use of a suitable securing means.

3. The apparatus of claim 1 wherein said rear plate section, said front circular plate section and said middle section are integral sections of a single structure that is fabricated from a single piece of structural material.

4. The apparatus of claim 3 in which the single structure is fabricated by forging.

5. The apparatus of claim 3 in which the single structure is fabricated by casting.

6. The apparatus of claim 3 in which the single structure is fabricated by machining.

7. The apparatus of claim 3 in which the single structure encompassing the rear plate section, the front circular section, and the middle section is fabricated by extruding.

8. The apparatus of claim 1 wherein said actuator is secured to said front circular plate by a plurality of bolts.

9. The apparatus of claim 1 wherein the three sections forming said annular cavity are constructed of a material selected from the group consisting of carbon steel, stainless steel, a nickel alloy, and an aluminum alloy.

10. The apparatus of claim 1 wherein the actuator is activated by hydraulic means.

11. The apparatus of claim 1 wherein the actuator is activated by pneumatic means.

12. The apparatus of claim 1 wherein the actuator is activated by manual means.

13. The apparatus of claim 12 wherein the manual means is a jackscrew.

14. The apparatus of claim 1 wherein the ring of sealing material is one or more an elastomeric O-rings embedded in said first face of said blind flange.

15. The apparatus of claim 1 wherein said removable adapter plate is held in place within said annular cavity by being secured within a groove along the inside wall of said rear section of said annular cavity.

16. The apparatus of claim 15 wherein said removable adapter plate is additionally held in place by a pin is passed through a hole in the side of said groove and through a matching hole of said removable adapter plate.

* * * * *